M. B. Westhead,
Ribbon Roll Clip.
No. 3,693. Reissued Oct. 20. 1869.
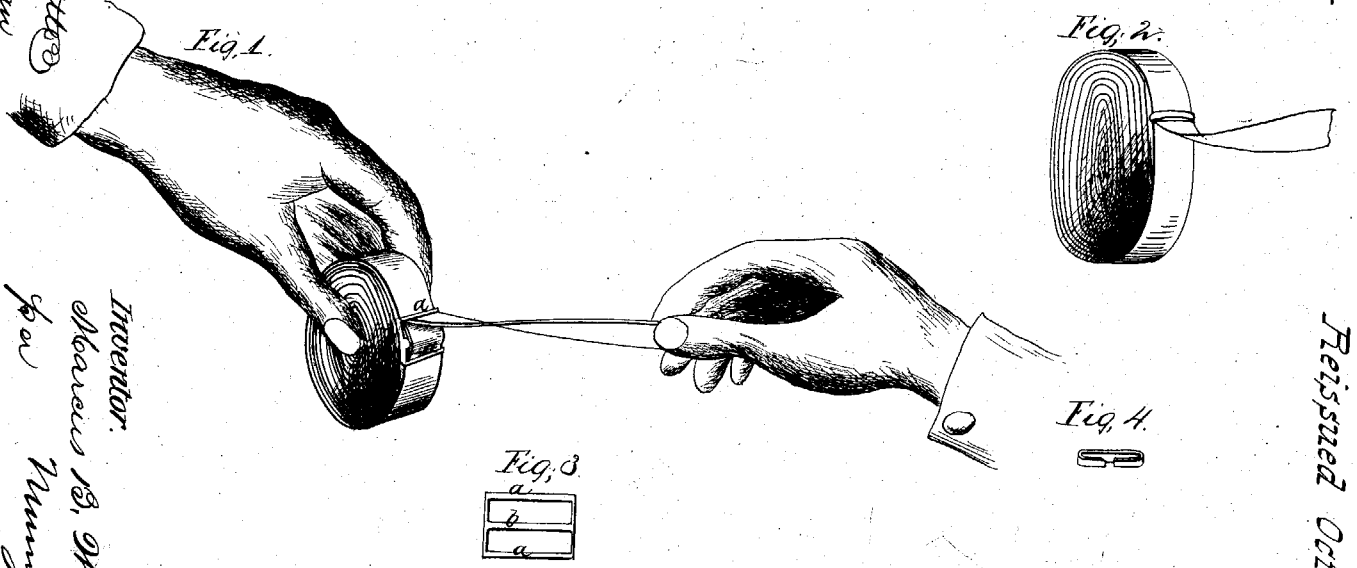
Witnesses.
H. C. Ashkettle
Wm A Morgan
Inventor.
Marcus B. Westhead
per Munn & Co
attorneys

United States Patent Office.

MARCUS BROWN WESTHEAD, OF MANCHESTER, ENGLAND.

*Letters Patent No.* 80,375, *dated July* 28, 1868; *reissue No.* 3,693, *dated October* 26, 1869.

IMPROVED TAPE-ROLL CLIP-FASTENING.

The Schedule referred to in these Letters Patent and making part of the same.

*To all whom it may concern:*

Be it known that I, MARCUS BROWN WESTHEAD, of Manchester, England, have invented a new and improved Clip for Ribbon-Rolls; and I do hereby declare that the following is a full, clear, and exact description thereof, which will enable those skilled in the art to make and use the same, reference being had to the accompanying drawings, forming part of this specification.

The object of this invention is to provide a clip or slide, which shall operate as a clamp to hold the end of narrow textile fabrics when the same are coiled in the form of a roll, and to permit a part of the said tape or ribbon to be withdrawn by the simple operation of pulling the tape or ribbon, while the tape is held in the usual manner.

Figure 1 shows a roll of tape or ribbon, secured by my improved slide, and being drawn from the roll in the usual manner.

The clip is shown in detail at Figure 3, and a modification of the same is shown at Figure 4.

Similar letters of reference indicate corresponding parts.

The clip is provided with flanges upon two opposite sides, and is applied to the roll by passing one or two or more parts of the coil under the end bars *a a* of the clip, and over the middle bar *b* of the same, as shown at fig. 1.

The modification shown at fig. 4 consists merely of a flattened band of sheet-metal, as shown, through which several parts of the coil, including the exterior one, are passed.

When more of the fabric has been drawn from the roll than is required, the same can be wound thereon again by holding the clip with one hand, and turning the roll with the other.

Thus, by my invention, the roll is wound and unwound without soiling the fabric, and the exterior end of the said roll held firmly from unwinding.

The clip or slide may be of metal, or other suitable material, and when gilded will present an ornamental appearance.

I claim as new, and desire to secure by Letters Patent—

A ribbon or tape-roll clip or slide, made and applied substantially as herein described.

MARCUS BROWN WESTHEAD.

Witnesses:

JONATHAN POLLITT,
*Clerk, Manchester.*

THOMAS BOWKER,
*Clerk, Manchester.*